United States Patent [19]

Byles

[11] Patent Number: 5,374,138
[45] Date of Patent: Dec. 20, 1994

[54] SUBSURFACE IRRIGATION APPARATUS AND METHOD

[76] Inventor: Joe D. Byles, P.O. Box 700095, San Antonio, Tex. 78270

[21] Appl. No.: 234,705

[22] Filed: Apr. 28, 1994

Related U.S. Application Data

[63] Continuation of Ser. No. 63,508, May 18, 1993, abandoned.

[51] Int. Cl.$^5$ .............................................. A01G 25/06
[52] U.S. Cl. ...................................... 405/38; 138/103; 138/177; 239/276; 405/43
[58] Field of Search .................. 405/36, 38, 43, 44, 405/45, 51; 138/103, 105, 177, 178; 239/104, 120, 145, 276

[56] References Cited

U.S. PATENT DOCUMENTS

| | | | |
|---|---|---|---|
| 3,908,385 | 9/1975 | Daniel et al. | 405/38 X |
| 4,023,506 | 5/1977 | Robey | 405/43 X |
| 4,061,272 | 12/1977 | Winston | 405/45 |
| 4,117,685 | 10/1978 | Skaife | 405/36 |
| 4,188,154 | 2/1980 | Izatt | 405/43 |
| 4,628,966 | 12/1986 | Kanao | 138/105 X |
| 4,832,526 | 5/1989 | Funkhouser | 405/43 |
| 5,074,708 | 12/1991 | McCann | 405/38 |
| 5,232,159 | 8/1993 | Abbate et al. | 239/276 |

FOREIGN PATENT DOCUMENTS

| | | | |
|---|---|---|---|
| 941106 | 4/1956 | Germany | 138/103 |
| 43579 | 1/1918 | Sweden | 405/45 |
| 2232865 | 1/1991 | United Kingdom | 405/45 |

*Primary Examiner*—Randolph A. Reese
*Assistant Examiner*—John A. Ricci

[57] ABSTRACT

A subsurface irrigation system includes one or more water distributing branches comprising a water emitting conduit and a water deflector member. The water emitting conduit extends through the area to be watered buried at an emitting depth below the surface of the area and is capable of receiving water at one end and emitting the water at a low overall flow rate along its length. The deflector member extends the entire length of the water emitting conduit generally below the level of the conduit and defines a deflecting area. The water deflector member comprises a layer of substantially water impermeable material and its position generally below the water emitting conduit allows it to block the downward flow of water in the water deflecting area. Deflecting the water below the water emitting conduit forces the emitted water laterally with respect to the conduit and capillary action in the soil draws the deflected water further laterally to saturate a significant area only to the depth of the root zone. The lateral coverage is sufficient to efficiently position several parallel water distributing branches to irrigate a large area such as a lawn area.

16 Claims, 3 Drawing Sheets

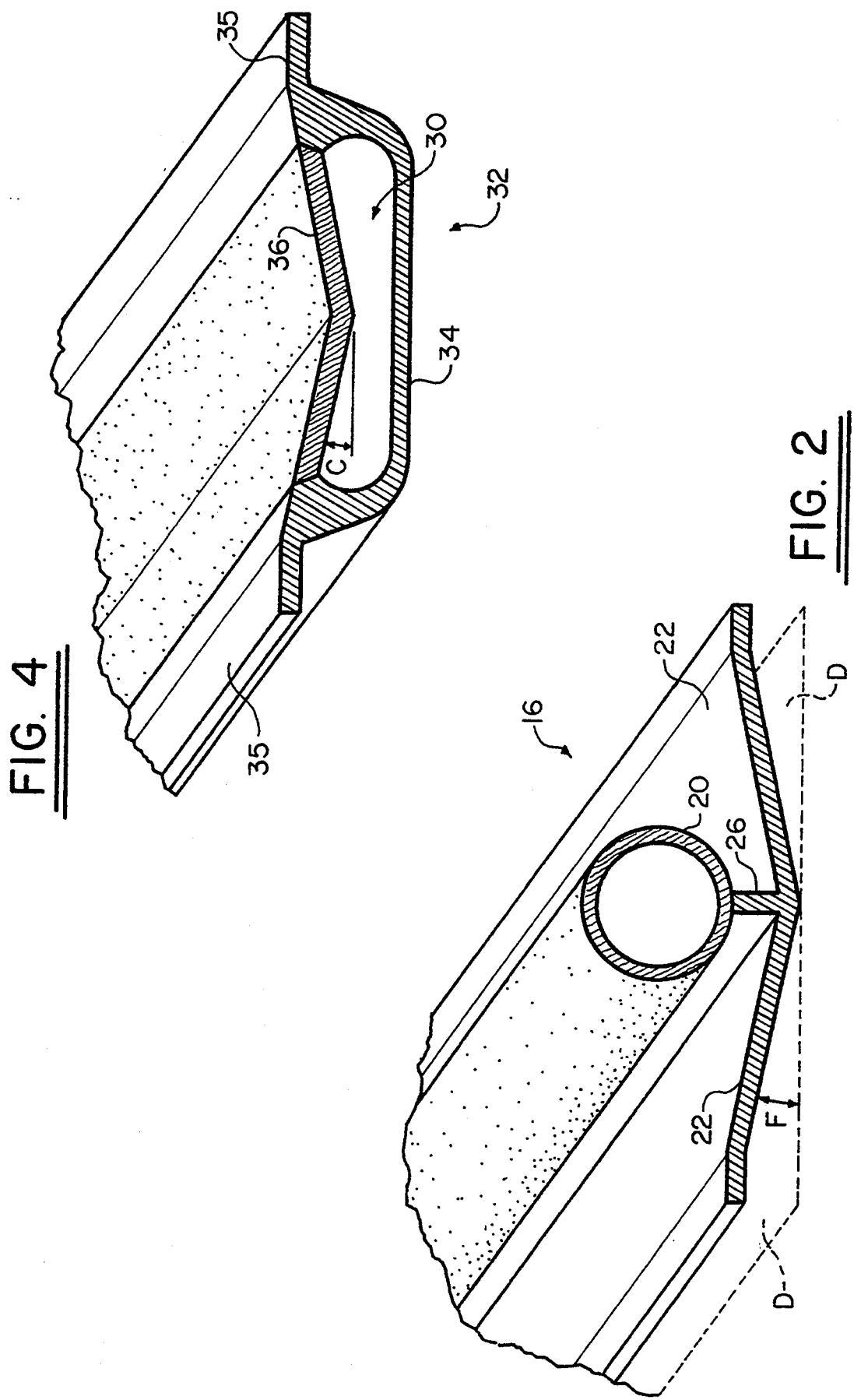

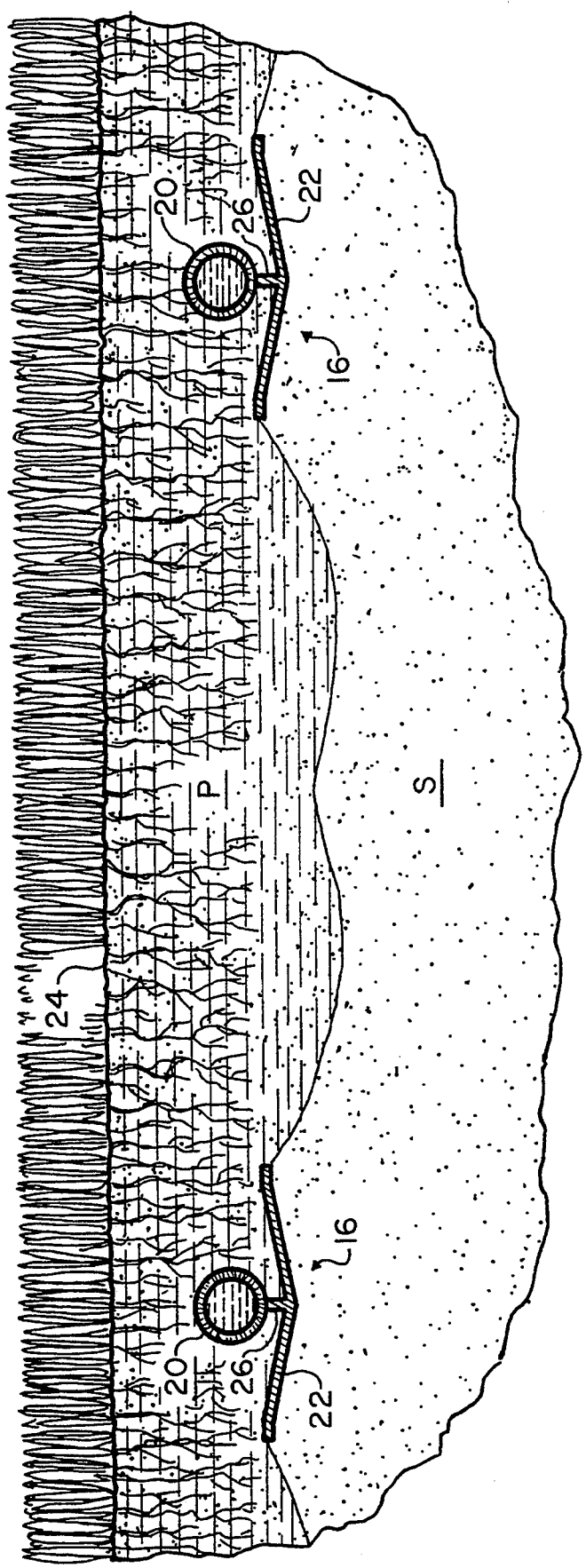

SUBSURFACE IRRIGATION APPARATUS AND METHOD

This application is a continuation of application Ser. No. 08/063,508, filed May 18, 1993, now abandoned.

BACKGROUND OF THE INVENTION

This invention relates to irrigation systems and particularly to a lawn area irrigation system that distributes and emits water below the surface at root level. The invention also encompasses a conduit apparatus for use in the system and a method of irrigating a lawn area by emitting water at root level.

Permanently installed lawn and landscape irrigation systems have become very popular in recent years. Common lawn and landscape irrigation systems include a network of underground PVC tubing which supplies irrigating water to sprinkler heads spaced out throughout the area of lawn to be watered. Although these permanent sprinkler head irrigation systems are much more convenient than manually positioning sprinkler heads, there are a number of problems associated with permanent sprinkler head type irrigation systems.

The most important problem with sprinkler head irrigation systems is that such systems make very inefficient use of irrigation water. Sprinkler head systems deliver water to an area too fast for the surface to absorb and thereby waste irrigation water through runoff. Also, complete coverage of an area requires that the sprinkler heads be spaced such that their coverage areas overlap, as much as sixty percent overlap is common. This coverage overlap exacerbates the runoff problem. Also, the spray created by the sprinkler heads increases evaporation loss and in windy conditions is often blown outside of the area to be watered and into streets and parking areas, for example.

Other problems with sprinkler head irrigation systems include the susceptibility of sprinkler heads to damage. Not only are the sprinkler heads susceptible to damage during mowing or during activities in the lawn area, the heads also pose hazards to persons using the lawn area. Also, spray from the sprinkler heads often discolors fences and adjacent structures. Furthermore, the deep trenching required for the network of PVC tubing makes installation costs fairly high.

Newer drip irrigation systems utilize subsurface water emitters to release irrigating water and avoid many of the problems associated with sprinkler head systems. However, drip irrigation systems are useful only for trees and shrubbery and are inefficient for use in irrigating lawns. The inefficiency arises because drip emitters deliver a major portion of the water to an area too deep to be useful to lawn grasses.

SUMMARY OF THE INVENTION

It is a general object of the invention to provide a subsurface irrigation system and apparatus particularly adapted for efficiently irrigating lawn areas. Another object of the invention is to provide a method for efficiently irrigating lawn areas by delivering irrigation water below surface level.

In order to accomplish these objects, an irrigation system according to the invention includes water distributing branches that each include a water emitting conduit and a water deflector member. The water emitting conduit comprises a porous and permeable tubing capable of emitting water along its length and extending the length of an area to be watered at an emitting depth below the surface. The deflecting member comprises a layer of water impermeable material positioned below the conduit generally at or just below a maximum root zone depth. The layer of material forming the water deflector member defines a deflecting area that in plan view includes the conduit. The deflector member material prevents water emitted from the conduit from flowing downwardly below the deflector member depth and forces the water laterally across the deflecting area within the root zone. Once water moves laterally beyond the deflecting area, it may again flow downwardly under the force of gravity. However, the deflection allows capillary action in the root zone soil to draw the irrigating water further laterally from the water emitting conduit. The water emitting conduit and deflector member combination therefore allows the conduit to be spaced out sufficiently in most soil types to efficiently provide subsurface lawn irrigation without an excessive number of irrigation lines.

Although the water emitting conduit and deflector member may be separate, they are preferably integrally formed. In one form of the invention the water emitting conduit is a generally cylindrical tube of porous and water permeable material connected to the water deflector member along its entire length by a deflector connector. In another form, a center portion of the deflector member forms a lower part of the conduit and a porous and permeable material connected over this center portion forms an upper part of the conduit.

The method of the invention includes emitting irrigating water from the emitting conduit positioned at an emitting depth below the surface and generally within the root zone of the lawn. The method also includes blocking the downward movement of water in the deflecting area below the emitting conduit. Blocking the downward movement is performed by the deflector member at the lower most part or just below the lawn root zone and causes the irrigation water to spread out laterally to cover a relatively large lawn area.

The irrigation system and method according to the invention is much more efficient for lawn irrigation than sprinkler head irrigation systems. Perhaps the most significant improvement is in reducing evaporation loss, overspraying, and run-off. The subsurface irrigation system according to the invention also promotes deep root growth for a healthier, more freeze resistance lawn. Also, the irrigation system and apparatus according to the invention can be used while the lawn is being used and presents no surface obstacles to interfere with the use of the lawn area. Furthermore, the current irrigation system requires shallower trenching than sprinkler head systems and has a lower installation cost.

These and other objects, advantages, and features of the invention will be apparent from the following description of the preferred embodiments, considered along with the accompanying drawings.

BRIEF DESCRIPTION OF THE DRAWINGS

FIG. 2 is a perspective and transverse cross sectional view of a conduit and water deflector member according to one form of the invention.

FIG. 3 is a view in transverse section of an irrigation system according to the invention having two parallel water distribution branches.

FIG. 4 is a view in perspective and transverse cross section of an alternative form of the water emitting conduit and deflector member apparatus according to the invention.

DESCRIPTION OF THE PREFERRED EMBODIMENTS

Figure 1:
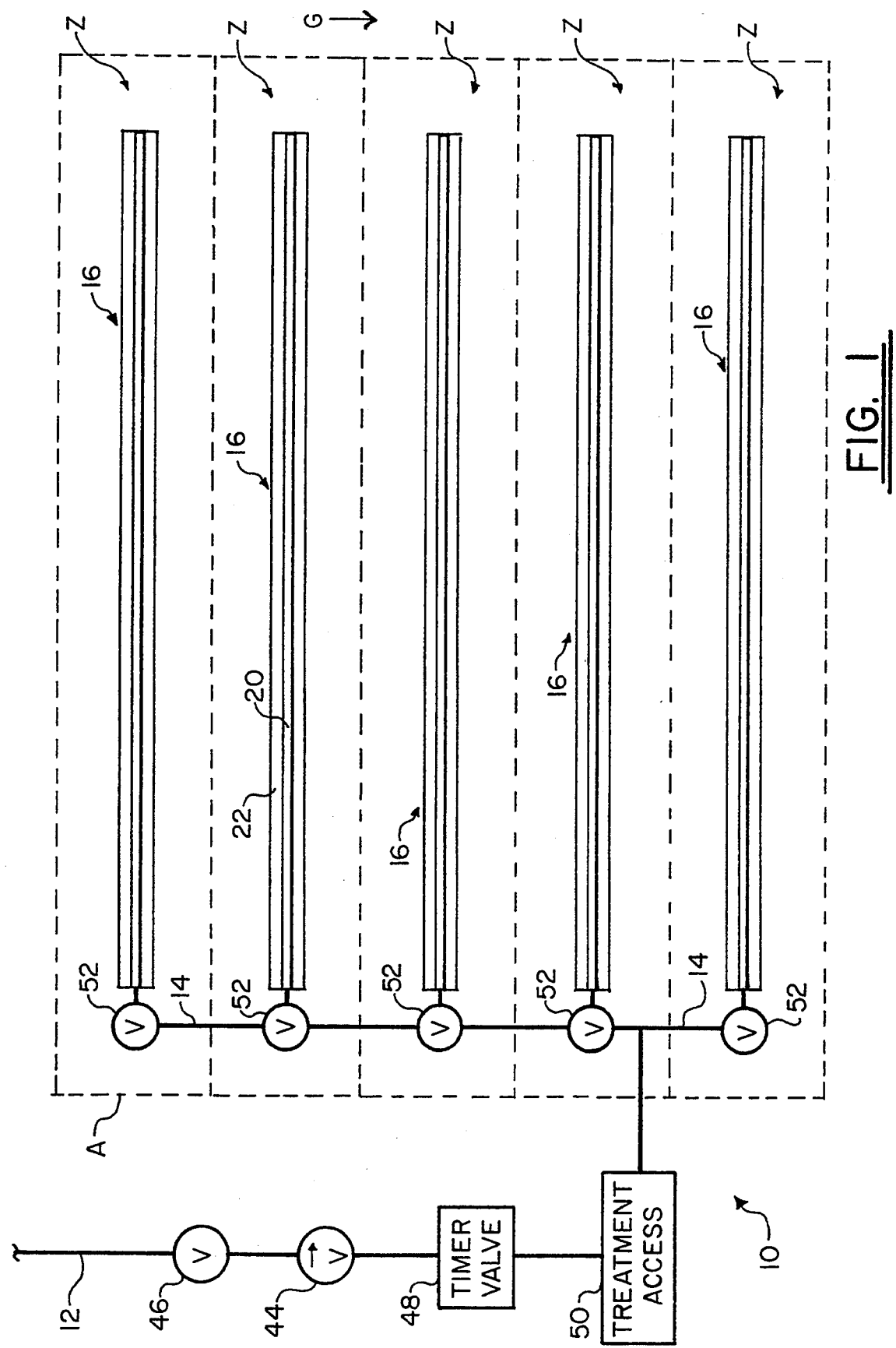
FIG. 1 is a diagrammatic plan view of an irrigation system embodying the principles of the invention.

FIG. 1 is a diagrammatic representation of a subsurface irrigation system 10 embodying the principles of the invention. The system 10 is adapted to water or irrigate an area A and includes a supply line 12, a header conduit 14, and a plurality of water distribution branches 16. Each water distribution branch 16 is adapted to irrigate a single conduit coverage zone Z, and the branches are aligned so that the different single conduit coverage zones Z in combination cover the entire area A to be irrigated.

Referring to FIGS. 2 and 3, each water distribution branch 16 includes a water emitting conduit 20 and a water deflector member 22. As shown in FIG. 3, the water emitting conduit 20 is positioned an emitting depth below the soil surface 24 in the area to be watered and the water deflector member 22 is positioned generally below the water emitting depth. The emitting depth may commonly be between two and six inches below the soil surface and the deflector member may commonly be positioned at a depth of up to eight inches below the soil surface 24.

The water emitting conduit 20 comprises a length of conduit capable of emitting water preferably along its entire length. The water emitting conduit 20 may be any tube of material forming a flow channel along its length capable of carrying water and allowing the water to seep out through the channel walls at a low flow rate. In one form of the invention the conduit 20 comprises a soaker hose formed from a material that includes continuous voids or channels providing both porosity and permeability. Alternatively, the conduit 20 may be formed from a water impermeable material and the pores or channels subsequently drilled or otherwise formed to allow the required seepage. In any case, the pores or channels (not shown) formed in the conduit material to allow the required seepage should be small enough to prevent particles from the soil from entering and clogging the material.

The deflector member 22 comprises a layer of water impermeable material positioned directly below the water emitting conduit 20 at a deflector separation distance below the level of the conduit. The deflector member 22 extends laterally a deflecting distance on either side of the water emitting conduit 20 and as shown in FIG. 2, defines a deflecting area D below the level of the conduit 20. The water impermeable deflector member 22 preferably comprises a sheet of low density polyethylene plastic and serves to block the downward flow of water in the deflecting area D. In the illustrated form of the invention, the deflector member 22 forms generally a V-shape having a deflecting angle F with respect to a horizontal plane on both legs of the V-shape. The deflecting angle F may be as much as 45° and as little as 0°.

In the form of the invention shown in FIGS. 2 and 3, the water emitting conduit 20 is generally cylindrical in shape and may have a diameter between one-half inch and one-quarter inch. The water deflector member 22 is connected to the conduit 20 by a deflector connector member 26 to maintain the deflector separation distance between the water emitting conduit and the deflector member. This deflector separation distance is preferably up to a distance equal to the diameter of the water emitting conduit. The lateral deflecting distance which the deflector member 22 extends on both sides of the water emitting conduit 20 may be a distance between one and four times the diameter of the water emitting conduit or up to three inches as measured from a vertical plane that includes the longitudinal axis of the conduit. Regardless of the relationship between the position of the water emitting conduit 20 and the deflector member 22, the deflector member is preferably positioned at or just below the root zone of the plants, usually lawn grass, in the area A to be irrigated. The water emitting conduit 20 is preferably positioned within the plant root zone between two to six inches below the soil surface 24.

FIG. 4 shows an alternative form of water emitting conduit 30 and deflector member 32 combination. By contrast to the embodiment shown in FIGS. 2 and 3, in the embodiment shown in FIG. 4, a central portion 34 of the deflector member 32 forms a lower portion or perimeter of the water emitting conduit 30. A water permeable material 36 is connected or formed over the central portion 34 of deflector member 32 to form an upper portion or perimeter of the conduit 30. Although the outer portions 35 of the deflector member 32 and the water permeable material 36 may form a generally planar surface, they preferably form a V-shape with an angle C of around 20° with respect to a horizontal line. As with the water emitting conduit 20 shown in FIGS. 2 and 3, the permeability of the material 36 shown in FIG. 4 may be a characteristic of the material as formed or produced separately in a naturally impermeably material after the conduit 30 and deflector member 32 combination is formed.

Referring back to FIG. 1, the complete irrigation system 10 according to the invention includes the water supply line 12 and the header conduit 14 from which the water distributing branches 16, comprising the conduit 20 or 30 and deflector member 22 or 32 extend. The system 10 also includes a check valve 44, main shut-off valve 46, a timer controlled valve 48, and a treatment access port 50. The check valve or anti-siphon valve 44, prevents the accidental flow of water back into the water supply and is a common element in permanent irrigation systems as are the main shut off valve 46 and the timer controlled valve 48. In addition to having a timer and solenoid for opening and closing the valve, the timer controlled valve 48 may also include a rain sensor (not shown) for deactivating the timer when rain eliminates the need for irrigation. The treatment access port 50 is unique to the system 10 and comprises a port with a removable cover or other arrangement (not shown) for injecting or otherwise introducing water soluble or liquid fertilizers, soil activators, or other lawn treatments into the irrigating water.

The system 10 also preferably includes adjustable pressure regulator valves 52 at the connection between the header conduit 14 and the water emitting conduit 20 or 30 of each water distributing branch 16. As indicated in FIG. 1, where the system 10 is installed in a sloping area, the various water distributing branches 16 are aligned perpendicularly to the slope G to avoid pressure differentials and differential flow rates along the length of the water emitting conduit 20 or 30 in each water distributing branch.

The operation and method of the invention may be described with reference to FIGS. 1 through 3. The method of the invention includes emitting water at a subsurface level along the length of the emitting conduit 20. The method also includes blocking the downward flow of water in the deflecting area D. As best shown in FIG. 3, the step of blocking the downward flow of water in the deflecting area D causes the irrigation water to spread out laterally above the deflector member 22. Capillary pressure in the soils then draws the deflected irrigating water further laterally while gravity produces downward movement beyond the deflector member. The wetting or saturation profile produced by the combination of the water emitting conduit 20 and deflector member 22, is shown at P in FIG. 3.

The lateral deflection caused by the water deflector member 22 combined with the capillary action in the soils allows saturation at root level or in the root zone throughout the single conduit coverage zone Z. Depending upon the soil characteristics in the area to be irrigated, efficient root zone saturation may be provided in an area extending up to approximately 2.5 feet on either side of the water emitting conduit 20. Thus, water distributing branches 16 positioned parallel to each other and spaced up to five feet apart produce efficient irrigation throughout the area A to be irrigated.

Soil conditions affect the width of the single conduit coverage zone mainly by the capillary action present in different soil types. Fine particle soils, such as clays, and soils with high organic material content have a characteristic capillary action strong enough to draw the irrigating water relatively further laterally before gravity drainage allows water to flow to a substantial depth below the root zone. Thus, the maximum spacing of five feet between branches 16 and minimum deflector member width of around two inches may be used in fine grained soils. However, soils made up of larger particles, such as soils with a high sand content, produce a relatively low capillary action and require a shorter spacing between water distributing branches 16 in the irrigation system 10 according to the invention. The required spacing may be as little as 2.5 feet in such large grained soils with a maximum deflector width of approximately six inches.

The above described preferred embodiments are intended to illustrate the principles of the invention, but not to limit the scope of the invention. Various other embodiments and modifications to these preferred embodiments may be made by those skilled in the art without departing from the scope of the following claims.

I claim:

1. A subsurface irrigation system including at least one water distributing branch, each water distributing branch adapted to irrigate a branch area having a branch length and a branch width and each water distributing branch comprising:
   (a) a water emitting conduit extending substantially the length of the branch area and being buried within a substantially continuous and homogeneous growing medium at an emitting depth below the surface of the branch area with a substantially continuous and homogeneous layer of growing medium extending from the emitting depth to the surface of the branch area, the water emitting conduit being capable of receiving water from a water supply and emitting the water at a plurality of emitting locations along its length; and
   (b) a water deflector member extending substantially the entire length of each water emitting conduit emitting location and defining a deflecting area at each respective emitting location with the water emitting conduit at the respective emitting location residing within said deflecting area, each water deflector member comprising a layer of substantially water impermeable material having a width less than the branch width and being buried under the growing medium at the respective emitting location in position to act as a barrier against the downward movement of water below a root zone depth in the water deflecting area.

2. The irrigation system of claim 1 further comprising:
   (a) a water pressure regulator for each water emitting conduit, each water pressure regulator being connected to a different water emitting conduit.

3. The irrigation system of claim 1 wherein the area to be watered is made up of a plurality of different single conduit coverage zones and the irrigation system includes one water distributing branch for each single conduit coverage zone.

4. The irrigation system of claim 1 wherein:
   (a) the water deflector member is positioned a deflector separation distance below the water emitting conduit.

5. The irrigation system of claim 4 further comprising:
   (a) a deflector connecting member connecting the water emitting conduit and deflector member along substantially their entire lengths.

6. The irrigation system of claim 4 wherein:
   (a) the water emitting conduit has a generally circular transverse cross sectional shape;
   (b) the deflector separation distance is between 0 and 1 times the diameter of the water emitting conduit; and
   (c) the deflecting area extends a lateral deflecting distance from a vertical plane that includes the longitudinal axis of the water emitting conduit and the lateral deflecting distance is between 1 and 4 times the diameter of the water emitting conduit.

7. The irrigation system of claim 1 wherein the deflector member forms substantially a V-shape in transverse section.

8. The irrigation system of claim 1 wherein:
   (a) the water emitting conduit and water deflector member are integrally formed with a center portion of the water deflector member forming a lower side of the water emitting conduit; and
   (b) an upper side of the water emitting conduit comprises a water permeable material connected to the center portion of the water deflecting member to form a conduit there between.

9. A subsurface irrigation apparatus comprising:
   (a) a water emitting conduit capable of receiving water from a water supply and emitting the water through emitting openings at emitting locations along its length; and
   (b) a water deflector member connected to the water emitting conduit and comprising a layer of substantially water impermeable material spaced from the emitting openings at each emitting location, the water impermeable material extending a distance at least equal to a lateral width of the water emitting conduit from the water emitting conduit on both a first lateral side of such conduit and on an opposite second lateral side of such conduit and defining a deflector area within which the emitting locations of the water emitting conduit reside.

10. The irrigation apparatus of claim 9 wherein:

(a) the water emitting conduit has a generally circular transverse cross sectional shape;
(b) the deflector member is spaced from the water emitting conduit a deflector separation distance up to one times the diameter of the water emitting conduit; and
(c) the deflector area extends a lateral deflecting distance on both side of the longitudinal axis of the water emitting conduit and the lateral deflecting distance is between one and four times the diameter of the water emitting conduit.

11. The irrigation apparatus of claim 9 wherein the deflector member forms generally a V-shape.

12. The irrigation of claim 9 wherein:
(a) the water emitting conduit and water deflector member are integrally formed with a center portion of the water deflector member forming a lower side of the water emitting conduit; and
(b) an upper side of the water emitting conduit comprises a water permeable material connected to the center portion of the water deflecting member to form a conduit therebetween.

13. The apparatus of claim 9 wherein the emitting locations extend continuously along substantially the entire length of the water emitting conduit.

14. The irrigation apparatus of claim 9 wherein the water deflector member forms a channel having channel side walls and a channel opening with a width equal to a total width of the deflector area at substantially each point along the length of the channel.

15. The subsurface irrigation apparatus of claim 9 wherein the conduit includes a porous and permeable material at the emitting locations.

16. A method of irrigating a lawn area with a water emitting conduit buried at an emitting depth under the surface of the lawn area and extending along a length thereof, the lawn area having a lawn width and a lawn length and the method comprising the steps of:
(a) blocking the downward movement of water with a water deflector member which defines a water deflector area within which the water emitting conduit resides and which has a width less than the lawn width, the water deflector member preventing water from moving downwardly substantially below a lawn root zone in the water deflector area but allowing water to move downwardly below the lawn root zone outside of the water deflector area:
(b) emitting water at a plurality of emitting locations along the length of the water emitting conduit until the entire volume of soil within the water deflector area and above the water deflector member is substantially saturated; and
(c) continuing to emit water at the plurality of emitting locations after the entire volume of soil within the water deflector area and above the water deflector member is substantially saturated with water, and until the entire volume of soil in the lawn area above the lawn root zone is substantially saturated.

* * * * *